(12) United States Patent
Mickeleit

(10) Patent No.: US 8,407,295 B2
(45) Date of Patent: Mar. 26, 2013

(54) METHOD AND SYSTEM FOR MANAGING DATA, AND A CORRESPONDING COMPUTER PROGRAM AND A CORRESPONDING COMPUTER-READING STORAGE MEDIUM

(75) Inventor: Carsten Mickeleit, Berlin (DE)

(73) Assignee: Cortado AG, Berlin (DE)

( * ) Notice: Subject to any disclaimer, the term of this patent is extended or adjusted under 35 U.S.C. 154(b) by 385 days.

(21) Appl. No.: 11/624,783

(22) Filed: Jan. 19, 2007

(65) Prior Publication Data

US 2008/0172483 A1 Jul. 17, 2008

(30) Foreign Application Priority Data

Jan. 12, 2007 (DE) .......................... 10 2007 002 617

(51) Int. Cl.
*G06F 15/16* (2006.01)
*H04L 12/16* (2006.01)
*H04L 12/50* (2006.01)
(52) U.S. Cl. ........ 709/206; 709/233; 709/248; 370/388; 370/352
(58) Field of Classification Search .................. 709/206, 709/233, 248; 455/556; 370/338, 352
See application file for complete search history.

(56) References Cited

U.S. PATENT DOCUMENTS

| 6,256,666 B1 | 7/2001 | Singhal |
| 2002/0013869 A1 | 1/2002 | Taniguchi et al. |
| 2002/0194325 A1* | 12/2002 | Chmaytelli et al. .......... 709/224 |
| 2004/0078437 A1* | 4/2004 | Guillemin ...................... 709/206 |
| 2004/0248583 A1* | 12/2004 | Satt et al. .................... 455/452.2 |
| 2006/0080366 A1* | 4/2006 | Miyachi et al. ............... 707/200 |
| 2006/0133340 A1 | 6/2006 | Rybak et al. |
| 2006/0155810 A1* | 7/2006 | Butcher ......................... 709/206 |
| 2006/0155814 A1 | 7/2006 | Bennet et al. |
| 2006/0168061 A1* | 7/2006 | Enatsu et al. .................. 709/206 |
| 2006/0259559 A1* | 11/2006 | Sullivan et al. ............... 709/206 |

FOREIGN PATENT DOCUMENTS

| EP | 1 253 761 A2 | 10/2002 |
| EP | 1 274 017 A1 | 1/2003 |

* cited by examiner

*Primary Examiner* — Peter Shaw
(74) *Attorney, Agent, or Firm* — Norris McLaughlin & Marcus, P.A.

(57) ABSTRACT

The invention relates to a method and a system for managing data, and a corresponding computer program and a corresponding computer-readable storage medium, which can be used, in particular, to save, for example, e-mails in a folder structure on a server by using an e-mail push client, which are known, for example, as Blackberry devices.

It is a method for managing data, the data are saved as e-mail or messages on a mail server and/or a server of a message signaling system. At least one application with at least one function for data processing is installed on a terminal. In addition, the terminal sends a request for managing data to the mail server and/or the server of a message signaling service by using the data managing function, and the data are transmitted to a file server according to the request from the mail server and/or the server of a message signaling service, where they are saved in a file system, wherein the stored data can be accessed from a file management program.

16 Claims, 1 Drawing Sheet

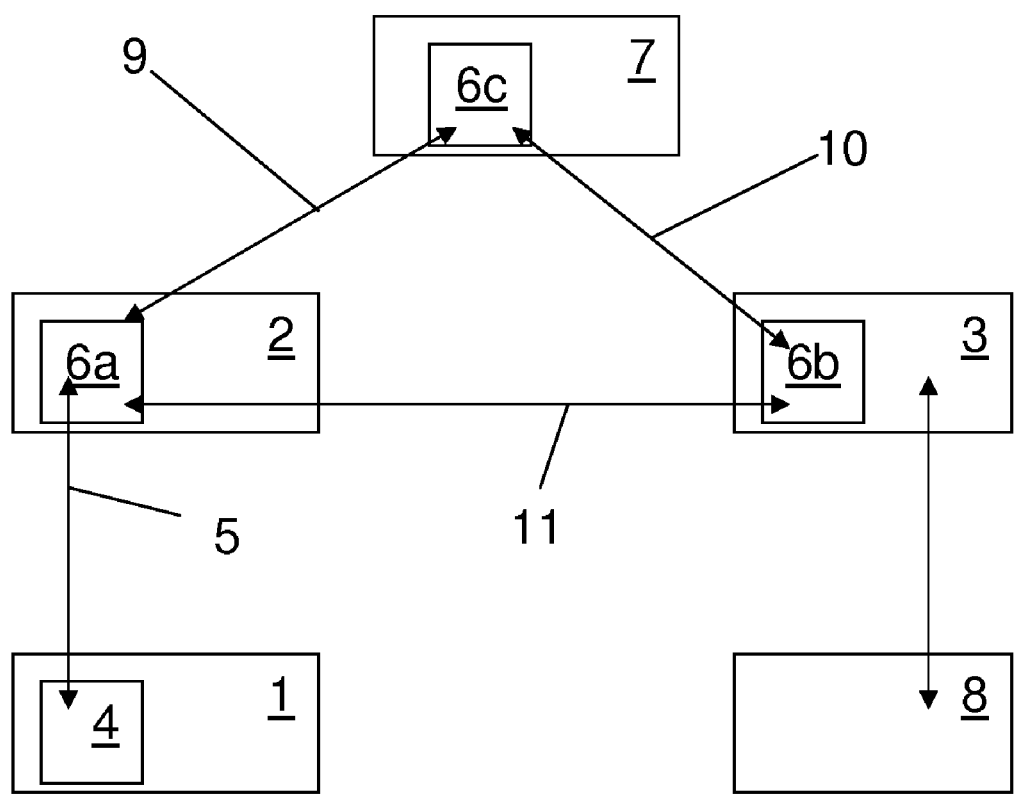

METHOD AND SYSTEM FOR MANAGING DATA, AND A CORRESPONDING COMPUTER PROGRAM AND A CORRESPONDING COMPUTER-READING STORAGE MEDIUM

The invention relates to a method and a system for managing data and a corresponding computer program and a corresponding computer-readable storage medium, which can be used, in particular, to save, for example, e-mails by using an e-mail push client, which are known, for example, as Blackberry devices, in a folder structure on a server. In the following, the term e-mail push client refers to data processing systems capable of using e-mail push services, i.e. in particular, capable of cooperating with an e-mail push server, e.g., a Blackberry server.

For example, for saving e-mails and/or their attachments in a remote file system, conventional approaches require to load these e-mails and/or attachments in a first step onto the terminal that is connected with the mail server, and to transmit the e-mails and/or attachments from this terminal to the remote file system only in a second step. However, downloading to the terminal is not desirable, in particular when using small-format terminals, for example e-mail push clients, also known as so-called Blackberry devices, due to their limited storage capacity. It is frequently also desirable when using e-mail programs on other terminals, to save e-mails and/or their attachments directly from the mail server to a file system.

Message push clients, in particular e-mail push clients, which are designed explicitly for displaying and processing of e-mail messages, have a limited capability for displaying e-mail attachments; however, they do not offer a capability to save the e-mail attachments directly from the mobile terminal in folders on remote servers, to back them up, to edit them or to make them available to other users.

The Blackberry push mail technology is optimized so that when an e-mail is received at the mail server, only text information which may also be limited in size is automatically transmitted to the mobile Blackberry device. E-mail attachments are not automatically transmitted to the terminal, but instead only information about the number of attachments,
 the file names of the attachments, and
 the file size of each attachment.

Access to an attached file is possible only for viewing via the "Download" of the attachment to the mobile Blackberry terminal. However, this download does not actually involve downloading of the original attachment, but only downloading of a file optimized for display. It is not possible to save the attachment in a file system. After downloading, the attachment can always be quickly displayed, i.e., only on the Blackberry terminal itself, by way of the corresponding e-mail. To this end, the available standard applications on the Blackberry terminal "Attachment Viewer" for Office documents (supported *.txt, *.doc,/*.dot, *.xls, *.ppt, *.pdf, *.html/ *.htm, *.wpd, *.zip) and "Image Viewers" for normally used image files (supported *.bmp, *.gif, *.jpg, *.pnp, *.gif) must be installed and operational.

Other solutions that offer file operations for files saved on a mail or Blackberry server allow storing the files on the server in a directory; however, the files are hereby always first loaded from the server to the terminal and only thereafter stored in the destination directory. This has several disadvantages. On one hand, downloading and subsequent retransmission to the remote destination directory unnecessarily burdens the communication link. On the other hand, an application must be installed on the terminal which is capable of transmitting the downloaded file to the destination directory.

Moreover, e-mails and/or attachments from known e-mail programs (e-mail clients) cannot be saved at a remote storage location, unless they were previously downloaded to the terminal on which the e-mail program runs.

It is therefore an object of the invention to provide a method and a system for managing data as well as a corresponding computer program and a corresponding computer-readable storage medium, which obviate the disadvantages of the prior art solutions and, more particularly, reduce the burden on the communication networks.

The object is solved by the invention having the features set forth herein. Advantageous embodiments of the invention are also described herein.

According to a particular advantage of the method of the invention, a terminal causes data, in particular files, e-mails with and without attachments, messages with and without attachments, to be transmitted from a remote server to a second remote file server, where there are saved. According to the invention, the data are e-mails or messages which are saved on a mail server and/or a server of a message signaling service. An application which provides a function for data processing is installed on the terminal. The function for data processing is preferably a function which enables selection of a storage location for a file ("Save-As function"). According to another preferred embodiment, the "Save-As function" also enables renaming of the file. With the "Save-As function", a request for managing the data is transmitted to the remote mail server, the server of a message signaling service and/or a third data processing system. Such request includes at least information about the type of the management to be performed. This information can also be implicitly included in the request, for example, if the type of management is positively defined by the system. However, the files to be managed, the type of the management and the storage location in the destination system are preferably preset by the user of the terminal. In this case, the selected storage location together with the type of management is preferably transmitted in the request to a computer program, wherein the computer program may be installed on the mail server and/or the server of a message signaling service and/or a third data processing system. This computer program causes the data to be managed according to the request, e.g., to be transmitted from the mail server and/or the server of a message signaling service to a file server. A copy of the files transmitted to the file server may remain on the mail server and/or the server of a message signaling service (management function "Save-As"), or the files may be moved, i.e., deleted at the origin on the mail server and/or the server of a message signaling system. Preferably, at least parts of the files transmitted between the mail server and/or the server of the message signaling service and the file server, in particular the data to be managed or parts thereof, are transmitted on certain segments of the transmission paths in compressed and/or encrypted form.

The difference between a file system and a mail system is that a mail system always provides proprietary functions for access. These proprietary functions reside above the functions of the respective operating system. Files stored in a mail system cannot be accessed via operating system functions. Conversely, a file system represents a organizing and access system for files saved on a computer. The access functions for file systems are part of the operating system.

The process for managing data is initiated by the user of the terminal, but is executed on other data processing systems. In particular, the data to be managed do not flow via the terminal.

The file server is hereby independent of the system of the mail server or the server of a message signaling service, but may still be located on the same data processing system as the mail server or the server of a message signaling service.

According to the invention, the data are saved on the file server in a directory of a file system, where they can be accessed via remotely installed data management programs. Access may be implemented, for example, via FTP (File Transfer Protocol), SCP (Secure Copy) with SSH (Secure Shell), and the like. This has the advantage that these data are then available for further use, also by several users.

Advantageously, the terminal can be implemented as a mobile terminal, for example a PDA (Personal Digital Assistant), a mobile telephone, a Blackberry terminal and the like, because with the invention the frequently limited storage capability of these terminals can be used sparingly, because according to the invention the data to be managed are not loaded onto the terminal.

According to a preferred embodiment, the message signaling service is an e-mail push service. For this reason, a terminal is employed which cooperates with the server of a message signaling service. This can be, for example, a Blackberry terminal.

Applications installed on the terminal can include, for example, an e-mail program (e-mail client),
an information manager, for example Outlook, or
a functionality which enables cooperation with the server of a message signaling service, (e.g., communication programs installed on a Blackberry terminal, such as the built-in Blackberry mail program).

Preferably, the function for data management is integrated in this application and uses at least partially the architecture provided by the mail server and/or the server of a message signaling service, i.e., in particular the server of a message signaling service and its communication with the client and the mail server.

The data processing function can be offered within the application in form of a button or a menu field.

As mentioned above, the information for managing data can be preset, so that these preset parameters, for example the type of management (copying, moving, format of the stored data which may optionally also include format conversion, and the like), the new storage location and the like, are used when using the function for data management. Preset parameters have, for example, the particular advantage that the destination server need not be reachable directly from the terminal; it is sufficient if the destination server can be reached from the mail server and/or the server of a message signaling service.

However, it is particularly advantageous if at least a portion of the parameters can be selected by the user of the terminal.

According to another preferred embodiment of the invention, the request for managing data can be transmitted via a wireless communication link. For example, mobile radio technology can here be employed, such as Global System for Mobile Communications (GSM),
General Packet Radio Service (GPRS),
Code Division Multiple Access (CDMA), or
Universal Mobile Telecommunications System (UMTS).

According to a preferred embodiment of the invention, when data located on a server of a message signaling service are to be managed, a communication link that can be used by the message signaling service is also used for transmitting the data management request from the terminal to the server of a message signaling service. Preferably, a channel of the Mobile Data Service (MDS) can be used.

The data can be transmitted from the mail server and/or the server of a message signaling service directly to the destination system, e.g., a file server, i.e., without going through a third data processing system. However, it may also be necessary to transmit the data first from the mail server and/or the server of a message signaling service to at least a third data processing system, and thereafter to the destination system. According to the invention, the terminal which sends the request for managing the data, is not viewed as the third data processing system. In this case, too, the data are transmitted from the mail server and/or the server of a message signaling service to the file server via at least a third data processing system, excluding the terminal.

The data to be managed may be transmitted to the destination system as e-mail or via FTP at least along individual segments of the transmission path. Depending on the situation, a person skilled in the art may also contemplate using other transmission modes.

As mentioned above, the data saved on the mail server and/or the server of a message signaling system may include e-mails or messages with or without attachment. The messages may include messages sent via a Short Message Service (SMS), or
messages sent via a Multimedia Message Service (MMS).

The data to be managed can be processed in various ways. For example, the data can be stored in the remote file system as e-mail with or without attachment,
message with or without an attachment, or
attachments separate from the e-mail or message.

In the method of the invention, one application runs on a terminal which displays to the user information and documents which are located on a second data processing system located in a computer network, on a mail server or on a server of a message signaling service. In the context of this application, the user is offered a function for saving this information or documents in a folder structure on the mail server, on the server of a message signaling service or on another destination system in the computer network.

The information and documents displayed on the terminal can be present in the application in their entirety, as an image or a text-based preview, or only as a reference. However, according to the invention, instead of the information and documents used for display on the terminal, the corresponding documents are saved on the mail server or the server of a message signaling service in the selected folder structure of the destination system.

Alternatively or in addition to saving information and documents in the folder structure of the destination system, saving functionality can also be enabled in the first terminal.

A system according to the invention for managing data is characterized in that it includes at least one terminal on which an application with at least one function for data management is installed,
at least one mail server, and/or
at least one server of a message signaling service, wherein the mail server and/or at least one server of a message signaling service can be located in a computer network, an intranet or the Internet or a combination thereof.

According to the invention, the data are saved in form of e-mail or messages on a mail server and/or a server of a message signaling service, and the system is arranged so as to enable managing of data, in that a request for managing data is transmitted from the terminal to a computer program by using the function for data management, data according to the request are transmitted from the mail server and/or the server of a message signaling service to a file server, and saved thereon in a file system, wherein the saved data can be accessed from a file management program.

A computer program for managing data after being loaded into the memory of a computer, enables a data processing system to execute a method for managing data, wherein the data are saved as e-mail or messages on an e-mail server and/or on a server of a message signaling service, wherein at least one application with at least one function for data management is installed on a terminal, wherein a request for management of data is transmitted from the terminal to a computer program by using the function for data management, wherein data according to the request are transmitted from the mail server and/or the server of a message signaling service to a file server and saved thereon as a file in a file system, wherein the saved data can be accessed from a file management program.

Such computer programs can be provided, for example, (fee-based or free of charge, freely accessible or password-protected) for downloading in a data or communication network. The provided computer programs can be used with a method, wherein a computer program is downloaded from an electronic data network, for example from the Internet, to a data processing system connected to the data network.

To perform the method of the invention for managing data, a computer-readable storage medium can be employed, on which a program is stored which, after being loaded into the memory of a computer, enables the computer to perform a method for managing data, wherein the data are saved as e-mail or messages on an e-mail server and/or on a server of a message signaling service, wherein at least one application with at least one function for data management is installed on a terminal, wherein a request for management of data is transmitted from the terminal to a computer program by using the function for data management, wherein data according to the request are transmitted from the mail server and/or the server of a message signaling service to a file server and saved thereon as a file in a file system, wherein the saved data can be accessed from a file management program.

The invention is therefore directed to a method which enables storing, for example, of e-mail messages and attachments of the e-mail messages received at a terminal, in particular a mobile terminal, such as for example a Blackberry device, to a remote directory, without initially downloading the e-mail messages or attachments to the terminal, regardless of the file type and the readability of the file on the (mobile) terminal.

The remote directory is located on a separate and dedicated server which is accessible from the mail server and/or the server of a message signaling service (e.g., a Blackberry Enterprise Server).

The invention provides a "Save As" function which in a preferred embodiment is integrated in an application. This application can be, for example, the proprietary Blackberry mail program.

The present invention of the "Save As" function enables access to a remote directory directly from Blackberry devices—by using the existing a Blackberry Enterprise Server architecture—, as well as storing an e-mail, a message or an attachment to an e-mail or message in this directory.

An exemplary embodiment of the invention will be described in more detail hereinafter with reference to the FIGURE of the drawing. It is shown in:

FIG. 1 an exemplary architecture for using the data management process according to the invention.

In the following, the invention will be described specifically for use with Blackberry devices 1. However, the invention is not limited to Blackberry devices 1 and can also be used with other information push clients, such as Symbian handies or notebooks. For example, it makes sense to manage files with the present invention also for other mobile devices, including PDAs or notebooks. For example, the invention offers the possibility to save e-mails and attachments without problem remotely on a destination system 3 by synchronizing the Outlook program while traveling.

The invention provides a method and a system which makes it possible to manage e-mail attachments and e-mail texts with a Blackberry terminal 1. As a particular exemplary embodiment, saving files on a destination server 3 and the function "Save As" will be described in more detail, whereby the invention shall not be limited to these functions for file management. To this end, a computer program module, in the following referred as client module 4, is provided on the Blackberry terminal 1. The client module 4 enables communication and data transfer between client module 4 and an additional computer program which controls data management, when a function for file management is called. This additional computer program can also be configured in modular form. The modules 6a, 6b, 6c can here be installed on the mail server, on the server 2 of a message signaling service, on the destination server 3 and/or on a third data processing system 7. For example, according to one embodiment, the client module 4 sends to the program module 6a on the Blackberry server 2 information for data management via a first communication link 5, and the program module 6a on the Blackberry server 2 causes the corresponding data (always first) to be sent via a second communication link 9 to the program module 6c on the third a data processing system 7. The program module 6c on the third data processing system 7 subsequently prepares the data according to the user settings and sends the prepared data via a third communication link 10 to the destination server 3.

Preparation of the data may hereby include detaching the attachment of a mail from the mail. In this way, the format of the e-mail with limited accessibility is converted into a general accessible file format (*.doc, *.pdf, *.pgp, *.jpg and the like).

In an embodiment where a directory in a destination system 3 where the files are stored is defined by the system, a program module 6b is preferably located on this destination system 3, which performs these preparations. In this situation, the data are sent to the destination system 3 via an additional communication link 11.

Storing attachments in a remote directory directly from a Blackberry device 1 is made possible by installing the client module 4 on the Blackberry device 1.

When an e-mail is received, an option "Save As" is provided via the Blackberry menu, which is provided by the graphic user interface of the Blackberry device 1. With the "Save As" option, either the e-mail text (as *.txt file) or an attachment can be stored. The user defines the object to be stored (e-mail text or attachment) after selection of the "Save As" option. The storage destination location is then defined by the user in a conventional manner. In a particular exemplary embodiment, the storage location need not be selected, and the selected files (e-mail text or e-mail attachment) are stored in a directory defined by the system, which is automatically allocated to each user on the destination server 3.

The selected object is stored by the following process: after selection of the object to be stored and optionally a confirmation, the corresponding e-mail is sent in the background -transparent for the user—by the Blackberry server 2 via a communication link 11 to a software component 6b on the destination server 3, which detaches the attachment or initiates generation of a file, for example a *.txt file, from the e-mail text, and saves this file and/or the e-mail attachment, in the selected or predetermined user directory.

The remote directory, which can be user-defined or preset for each user by the system, is hereby a directory that is available on the remote destination server 3 and that can be accessed, on one hand, via the client module 4 installed on the Blackberry device 1. On the other hand, the user can access this directory via a Web browser or through authorization via login (user name/password) from any external computer 8 and store, i.e., download, the file to the local hard drive of an external computer 8.

The "Save As" option according to the invention for Blackberry devices 1 makes it therefore possible to:

Store e-mails or e-mail attachments received with a mobile Blackberry terminal 1. Attachments can thus be stored without requiring prior downloading of the file to the terminal.

Store files in their original format, i.e., also in formats which cannot be displayed in the Attachment Viewer of a Blackberry 1.

Embodiments of the invention are not limited to the aforedescribed preferred exemplary embodiments. Rather, a number of variations are feasible which make use of the system of the invention and the method of the invention even with fundamentally different implementations.

List Of Reference Symbols

| | |
|---|---|
| 1 | Blackberry device |
| 2 | Server of a message signaling service, Blackberry server |
| 3 | Destination server |
| 4 | Client module |
| 5 | Communication link |
| 6a, 6b, 6c | Program module |
| 7 | Third data processing system |
| 8 | External computer |
| 9 | Communication link |
| 10 | Communication link |
| 11 | Communication link |

The invention claimed is:

1. A method for storing data, wherein the data is saved as an e-mail, a message or an attachment to an e-mail or message on at least one mail server and server of a message signaling service, the data being addressed to a mobile terminal, the method comprising the following steps, prior to downloading the data to the mobile terminal:

signaling to the mobile terminal that the data is saved on the at least one mail server and server of a message signaling service by displaying a reference to the data on the mobile terminal;

transmitting a request from the mobile terminal to the at least one mail server and server of a message signaling service, the request to transfer and store at least a part of the data to a file server, wherein the mobile terminal has at least one application, installed thereon, which initiates a storing function of a computer program installed on the at least one mail server and server of a message signaling service;

transmitting the data, according to the request, from the at least one mail server and server of a message signaling service to a file server, wherein the file server is separate from the at least one mail server and server of a message signaling service; and storing the data at a storage location on the file server as a file in a file system, wherein the file system is independent of the at least one mail server and server of a message signaling service, and wherein the storage location is defined via the mobile terminal.

2. The method according to claim 1, wherein the mobile terminal enables a cooperation with the server of a message signaling service.

3. The method according to claim 1, wherein the at least one application is an e-mail program,
an information manager, or
a program of the mobile terminal which enables a cooperation with the server of a message signaling service.

4. The method according to claim 1, wherein the message signaling service is an e-mail push service.

5. The method according to claim 1, wherein the message is a message sent via a Short Message Service (SMS), or a message sent via a Multimedia Message Service (MMS).

6. The method according to claim 1, wherein the request for storing at least a part of the data is sent via a wireless communication link.

7. The method according to claim 6, wherein a mobile radio technology is employed for transmitting the request for storing at least a part of the data.

8. The method according to claim 7, wherein the employed mobile radio technology includes Global System for Mobile Communications (GSM),
General Packet Radio Service (GPRS),
Code Division Multiple Access (CDMA), or
Universal Mobile Telecommunications System (UMTS).

9. The method according to claim 1, further comprising transmitting the data between the server of a message signaling service and the mobile terminal via a communication link adapted for use with the message signaling service.

10. The method according to claim 9, wherein a Mobile Data Service (MDS) is used for transmitting the data between the server of a message signaling service and the mobile terminal.

11. The method according to claim 1, wherein the stored data comprise e-mails with or without attachment,
messages with or without an attachment, or
attachments separate from an e-mail or a message.

12. The method according to claim 1, wherein the data to be stored are transmitted to the file server as e-mail or via FTP at least on individual segments of a transmission path.

13. A system for storing data, comprising at least one mobile terminal on which at least one application is installed which initiates a storing function of a computer program for storing the data, and
at least one of a mail server and
a server of a message signaling service,
wherein the data, being addressed to the at least one mobile terminal, is saved in form of an e-mail, a message or an attachment to an e-mail or message on the at least one mail server or server of a message signaling service,
wherein the system is arranged so as to execute, prior to downloading the data to the at least one mobile terminal, the steps of:
signaling to the at least one mobile terminal that the data is saved on the at least one mail server or server of a message signaling service by displaying a reference to the data on the at least one mobile terminal,
transmitting a request from the at least one mobile terminal to the at least one mail server or server of a message signaling service, the request to transfer and store at least a part of the data to a file server, wherein the computer program, for storing the data, is installed on the at least one mail server or the server of a message signaling service, transmitting the data, according to the request, from the at least one mail server or server of a message signaling service to a file server, wherein the file server is separate from the at least one mail server and server of a message signaling service, and storing the data at a storage location on the file server as a file in a file system, wherein the file system is independent of the at least one mail server and server of a message signaling service, and wherein the storage location is defined via the mobile terminal.

14. A non-transitory computer-readable storage medium, on which a program is stored which, after being loaded into a memory of a computer, enables the computer to execute a method for storing data, wherein the data is saved as an e-mail, a message or an attachment to an e-mail or message on at least one e-mail server and server of a message signaling service, the data being addressed to a mobile terminal, the method comprising the following steps, prior to downloading the data to the mobile terminal:

signaling to the mobile terminal that data is saved on the at least one mail server and server of a message signaling service by displaying a reference to the data on the mobile terminal;

transmitting a request from the mobile terminal to the at least one mail server and server of a message signaling service, the request to transfer and store at least a part of the data to a file server, wherein the mobile terminal has at least one application, installed thereon, which initiates a storing function of a computer program installed on the at least one mail server and server of a message signaling service;

transmitting data, according to the request, from the at least one mail server and server of a message signaling service to a file server, wherein the file server is separate from the at least one mail server and server of a message signaling service; and storing the data at a storage location on the file server as a file in a file system, wherein the file system is independent of the at least one mail server and server of a message signaling service, and wherein the storage location is defined via the mobile terminal.

15. The non-transitory computer-readable storage medium according to claim 14, wherein the computer program is downloaded from an electronic data network to a data processing system connected to the electronic data network.

16. The non-transitory computer-readable storage medium according to claim 15, wherein the computer program is downloaded from the Internet.

* * * * *